J. BIRKENHEAD.

Spindle Bearing for Spinning Machines.

No. 9,474. Reissued Nov. 23, 1880.

*Witnesses.*

S. N. Piper

W. H. Lunt

*Inventor,*

*John Birkenhead,*

*by attorney.*

R. H. Eddy

N. PETERS, PHOTO-LITHOGRAPHER, WASHINGTON, D. C.

UNITED STATES PATENT OFFICE.

JOHN BIRKENHEAD, OF MANSFIELD, MASSACHUSETTS.

SPINDLE-BEARING FOR SPINNING-MACHINES.

SPECIFICATION forming part of Reissued Letters Patent No. 9,474, dated November 23, 1880.

Original No. 205,718, dated July 9, 1878. Application for reissue filed May 10, 1880

*To all whom it may concern:*

Be it known that I, JOHN BIRKENHEAD, of Mansfield, in the county of Bristol and State of Massachusetts, have invented a new and useful Improvement in Spindle-Bearings for Spinning-Machines; and I do hereby declare the same to be described in the following specification and represented in the accompanying drawings, of which—

Figure 1:
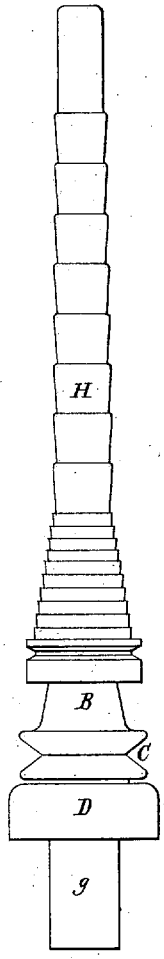
Figure 4:
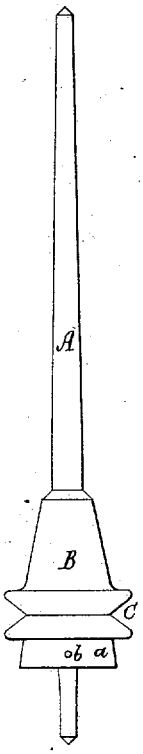
Figure 2:
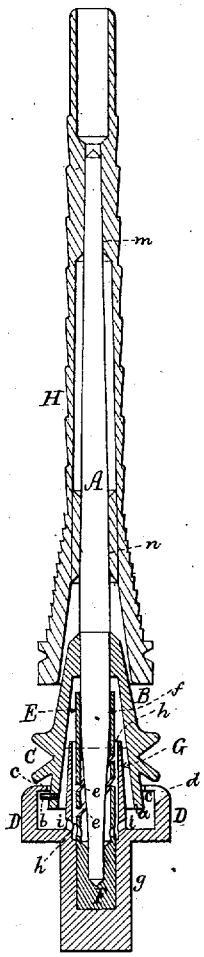
Figure 5:
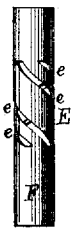
Figure 6:
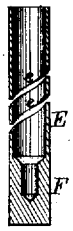
Figure 7:
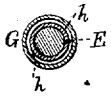
Figure 3:
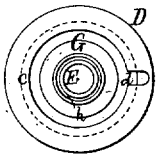

Figure 1 is a side elevation, and Fig. 2 a vertical section, of a live-spindle and its adjuncts embracing my invention, a bobbin being also exhibited as applied to the spindle. Fig. 3 is a top view of the oil trough or receiver. Fig. 4 is a side view of the live-spindle and the combined cap and whirl and stud, to be hereinafter explained. Fig. 5 is a side view, and Fig. 6 a vertical section, of the combined step and elastic bolster. Fig. 7 is a horizontal section taken through the spindle, bolster, and guard, to be hereinafter described.

The nature of my invention is duly defined in the claims herein presented.

In my improved spinning mechanism, as represented in the drawings aforesaid, the spindle A extends up through and is fixed to a tapering or conical cap, B, to which the whirl C is applied or makes part of it, as shown, the cap being extended below such whirl, as at *a*, and such extension of it being furnished with a short stud, *b*, to project from it externally. The said extension is to enter the mouth of the oil receiver or trough D, whose top is crowned or flanged inward, as shown at *c*, and is provided with a notch, *d*, for the stud *b* to pass through. This stud, while the spindle is in place and revolving, projects underneath the flange *c*, and with it serves to keep the spindle from rising in its bolster and step. This bolster (shown at E) is a tube projecting up from the step F, and is slotted, scored, or grooved helically above the step, as represented at *e e*, in order to render the bolster elastic or capable of springing or moving laterally.

The spindle has its upper bearing within the upper part of the bolster, as shown at *f*, while its foot is supported by the step, which is firmly secured in the tenon *g* of the oil-receiver.

Extending up from the bottom of the oil-receiver, and encompassing the elastic bolster, is the tubular guard or standard G, there being between it and the bolster a narrow intervening concentric space, *h*, which extends upward from the step. Within this space the bolster can move laterally, but by the guard will be prevented from being so moved too far. This guard, while allowing a sufficient spring to the bolster, is to prevent the bolster from being bent laterally to its injury.

The guard extends up within the cap B. Through the lower part of the guard, and also through the bolster, there are passages, as shown at *i i*, for the oil to pass from the trough into the step.

The helical slits or grooves of the bolster, besides answering to render it elastic, serve to cause the oil, during revolution of the spindle, to pass up into the spindle-bearing of the bolster.

The cap B, by surrounding the spindle, bolster, and guard, serves not only to intercept any oil that may be thrown off laterally by the spindle, but to convey such oil back into the oil-receiver.

The bobbin is shown at H. That part of the spindle extending below the whirl-supporting cap B, or from the cap to or into the step, is shorter than the part of said spindle which projects above the whirl-supporting cap, and the whirl is arranged between the step and the bolster-bearing for the spindle. The bobbin has frictional adhesive bearings for its application to the spindle, such being shown in Fig. 2 at *m* and *n*. As represented in the drawings, the spindle extends above the bolster a distance about three times the length of the part supported by the bolster and step.

By having the whirl and its cap and the spindle arranged relatively to the bolster-bearing and the step, and having such bearing free to play laterally, as described, the spindle, while revolving rapidly, becomes free to arrange itself in, or to come into, a vertical position, and thereby to operate to better advantage than results when the bolster is practically inflexible or inelastic, or incapable of lateral play while the spindle is revolving. It has been found in practice that with a rigid bolster the spindle not only does not operate so well, but is more liable to wear the bearing of the bolster than is the case with a bolster that is elastic or can move laterally a little; consequently I have so constructed the bolster, which, as shown, is directly fixed to or combined with the step. Thus the step and bolster-bearing have what may be termed an "elastic connection," to operate as described, the rigid guard surrounding this connection answering to limit the lateral movement of the bolster while the spindle may be revolving, or when any force may be applied to the spindle to cause it to bend or move the bolster laterally.

What I claim as my invention is as follows:

1. The combined step and elastic bolster, substantially and for use as described.

2. The combination of the oil-reservoir with the connected step and the elastic bolster, essentially as specified.

3. The combination of the tubular standard or guard with the oil-receiver, the connected step, and the elastic bolster, all being arranged substantially as set forth.

4. The combination of the spindle and the elastic bolster applied thereto, as described, with the whirl-supporting cap, arranged to encompass such bolster and extend down within the oil-receiver, as set forth.

5. The combination of the spindle A, whirl-supporting cap B, elastic bolster E, step F, guard G, and oil-receiver D, all being arranged and applied substantially as shown and described.

6. In combination with a spindle-foot step and a socketed receiver, *g*, therefor, and a tubular standard or guard, G, extending from the said receiver, a tubular spindle supporter or bolster extending up within the standard and over the step, and having between them, the said supporter and the said guard, an annular space, *h*, to admit of lateral movements of the supporter with the spindle when the latter, sustained by the said supporter and step, may be in revolution, the said step and bolster, as represented, being combined and to operate substantially as set forth.

7. The combination of the spinning-frame spindle A, whirl-supporting cap B, whirl C, yielding bolster E, step F, guard G, step-supporter *g*, oil-receiver D, and means of elevating oil from the latter to the bolster, whereby the bolster is kept oiled while enabled to yield laterally within the guard, as set forth.

8. A live-spindle and a bolster adapted to move laterally therewith radially to the axis of the spindle, in combination with a step for supporting the foot of the spindle, a stationary tubular standard or guard encompassing the bolster and separated therefrom by an annular space, as described, and with a whirl combined with the spindle and arranged between its bolster and step, and supported by a tubular cap fixed to the spindle, and provided with the said whirl and encompassing the bolster and guard, all being substantially as set forth.

JOHN BIRKENHEAD.

Witnesses:
R. H. EDDY,
W. W. LUNT.